(12) United States Patent
Kawakami (10) Patent No.: US 12,313,744 B2
(45) Date of Patent: May 27, 2025

(54) OPTICAL APPARATUS, IN-VEHICLE SYSTEM, AND MOBILE APPARATUS (71) Applicant: CANON KABUSHIKI KAISHA, Tokyo (JP)

(72) Inventor: Tomoaki Kawakami, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 675 days.

(21) Appl. No.: 17/205,371

(22) Filed: Mar. 18, 2021

(65) Prior Publication Data
US 2021/0302591 A1 Sep. 30, 2021

(30) Foreign Application Priority Data

Mar. 24, 2020 (JP) .................. 2020-052028

(51) Int. Cl.
*G01S 17/931* (2020.01)
*B60Q 9/00* (2006.01)
(Continued)

(52) U.S. Cl.
CPC ............ *G01S 17/931* (2020.01); *B60Q 9/008* (2013.01); *B60T 7/22* (2013.01); *G01S 17/08* (2013.01);
(Continued)

(58) Field of Classification Search
CPC ....... G01S 17/08; G01S 17/931; B60Q 9/008; B60T 2201/022; B60T 7/22
See application file for complete search history.

(56) References Cited

U.S. PATENT DOCUMENTS 3,944,336 A * 3/1976 Carr, Jr. ............... G02B 27/144
359/485.07
5,011,265 A * 4/1991 Tamamura ............. G02B 5/001
359/888
(Continued)

FOREIGN PATENT DOCUMENTS

CN 101713850 A 5/2010
CN 108351207 A 7/2018
(Continued)

OTHER PUBLICATIONS

Extended European Search Report issued by the European Patent Office on Aug. 20, 2021 in corresponding EP Patent Application No. 21163428.2.
(Continued)

*Primary Examiner* — Logan M Kraft
*Assistant Examiner* — Joshua Campbell
(74) *Attorney, Agent, or Firm* — Carter, DeLuca & Farrell LLP (57) ABSTRACT

An optical apparatus includes a deflector configured to deflect illumination light from a light source unit so as to scan an object and configured to deflect reflected light from the object, a light guide configured to guide part of the illumination light from the light source unit to the deflector, another part to a first light receiving element, and the reflected light from the deflector to a second light receiving element, and an optical element having an optical surface provided between the light guide and the second light receiving element. The optical surface tilts or is eccentric to a principal ray of the illumination light.

20 Claims, 10 Drawing Sheets (51) Int. Cl.
   *B60T 7/22*   (2006.01)
   *G01S 17/08*  (2006.01)
   *G02B 7/02*   (2021.01)
   *G02B 26/10*  (2006.01)

(52) U.S. Cl.
   CPC .............. *G02B 7/02* (2013.01); *G02B 26/10* (2013.01); *B60T 2201/022* (2013.01)

(56) References Cited

U.S. PATENT DOCUMENTS

| | | | |
|---|---|---|---|
| 5,627,669 A | 5/1997 | Orino et al. | |
| 5,831,757 A * | 11/1998 | DiFrancesco | G02B 26/105 359/198.1 |
| 8,238,012 B2 * | 8/2012 | Kobayashi | A61B 3/102 359/201.1 |
| 2003/0202796 A1 * | 10/2003 | Nagai | H04B 10/112 398/151 |
| 2004/0179209 A1 * | 9/2004 | Besch | H05K 13/081 356/614 |
| 2007/0263171 A1 * | 11/2007 | Ferguson | G01B 9/02044 351/206 |
| 2009/0059766 A1 * | 3/2009 | Yamada | G01S 17/66 |
| 2010/0053637 A1 * | 3/2010 | Isogai | G01S 7/4817 356/614 |
| 2010/0208232 A1 | 8/2010 | Hara | |
| 2011/0273757 A1 * | 11/2011 | Kobayashi | A61B 3/102 359/204.2 |
| 2013/0107358 A1 * | 5/2013 | Knebel | G02B 21/006 359/385 |
| 2014/0036071 A1 | 2/2014 | Nakamura | |
| 2015/0224956 A1 * | 8/2015 | Takenaka | B60R 21/0136 73/862.381 |
| 2018/0281757 A1 * | 10/2018 | Matsuo | H04N 13/204 |

FOREIGN PATENT DOCUMENTS

| | | |
|---|---|---|
| CN | 109991619 A | 7/2019 |
| JP | H09-021875 A | 1/1997 |
| JP | 2000-162243 A | 6/2000 |
| JP | 2001-202651 A | 7/2001 |
| JP | 2006-105774 A | 4/2006 |
| JP | 2007-298997 A | 11/2007 |
| JP | 4476599 B2 | 6/2010 |
| JP | 2019-138837 A | 8/2019 |
| JP | 6656438 B1 | 3/2020 |
| WO | 2018/179650 A1 | 10/2018 |

OTHER PUBLICATIONS

Chinese Office Action issued by the China National Intellectual Property Administration on Nov. 10, 2023 in corresponding CN Patent Application No. 202110294318.5, with English translation.
Notice of Reasons for Refusal issued by the Japanese Patent Office on Oct. 17, 2023 in corresponding JP Patent Application No. 2020-052028, with English translation.
Chinese Office Action issued by the China National Intellectual Property Administration on May 31, 2024 in corresponding CN Patent Application No. 202110294318.5, with English translation.
Chinese Office Action issued by the China National Intellectual Property Administration on Mar. 29, 2024 in corresponding CN Patent Application No. 202110294318.5, with English translation.

* cited by examiner

OPTICAL APPARATUS, IN-VEHICLE SYSTEM, AND MOBILE APPARATUS

BACKGROUND OF THE INVENTION

Field of the Invention

The present invention relates to an optical apparatus that detects an object by receiving reflected light from the illuminated object.

Description of the Related Art

LIDAR (Light Detection and Ranging) is one known method for measuring a distance to an object, and calculates the distance based on a receiving time of the reflected light from the illuminated object or a phase of the reflected light. Japanese Patent No. 4476599 discloses a configuration for measuring the position and distance of the object based on an angle of a deflector (drive mirror) when a light receiving element receives the light reflected from the object and a signal obtained from the light receiving element.

An apparatus using LiDAR may use an optical system and a light receiving element used to detect the illumination timing and to measure an emission light amount, in addition to the optical system and light receiving element used to measure the distance. In this case, light unnecessary for the distance measurement may be generated inside the apparatus and saturate the signal of the light receiving element. In particular, it is difficult to distinguish the unnecessary light and the reflected light from a short-distance object from each other because the reflected light from the object is received before the signal saturation caused by the unnecessary light is reset. As a result, the distance to the object cannot be accurately measured.

SUMMARY OF THE INVENTION

The present invention provides an optical apparatus, an in-vehicle system (vehicle mounted system), and a mobile apparatus, each of which can restrain unnecessary light from being received by a light receiving element.

An optical apparatus according to one aspect of the present invention includes a deflector configured to deflect illumination light from a light source unit so as to scan an object and configured to deflect reflected light from the object, a light guide configured to guide part of the illumination light from the light source unit to the deflector, another part to a first light receiving element, and the reflected light from the deflector to a second light receiving element, and an optical element having an optical surface provided between the light guide and the second light receiving element. The optical surface tilts or is eccentric to a principal ray of the illumination light.

An optical apparatus according to another aspect of the present invention includes a deflector configured to deflect illumination light from a light source unit so as to scan an object and configured to deflect reflected light from the object, and a light guide configured to guide part of the illumination light from the light source unit to the deflector, another part to a first light receiving element, and the reflected light from the deflector to a second light receiving element. A light receiving surface of the first light receiving element tilts to the principal ray of the illumination light.

An in-vehicle system and a mobile apparatus each having the above optical apparatus also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention. Corresponding elements in respective figures will be designated by the same reference numerals, and a duplicate description thereof will be omitted.

A distance measuring apparatus using LiDAR includes an illumination system that illuminates an object, and a light receiving system that receives reflected or scattered light from the object. LiDAR has a coaxial system in which optical axes of the illumination system and the light receiving system partially coincide with each other, and a non-coaxial system in which the optical axes do not coincide with each other at all. The distance measuring apparatus according to this embodiment is suitable for the coaxial LiDAR.

First Embodiment

Figure 1:
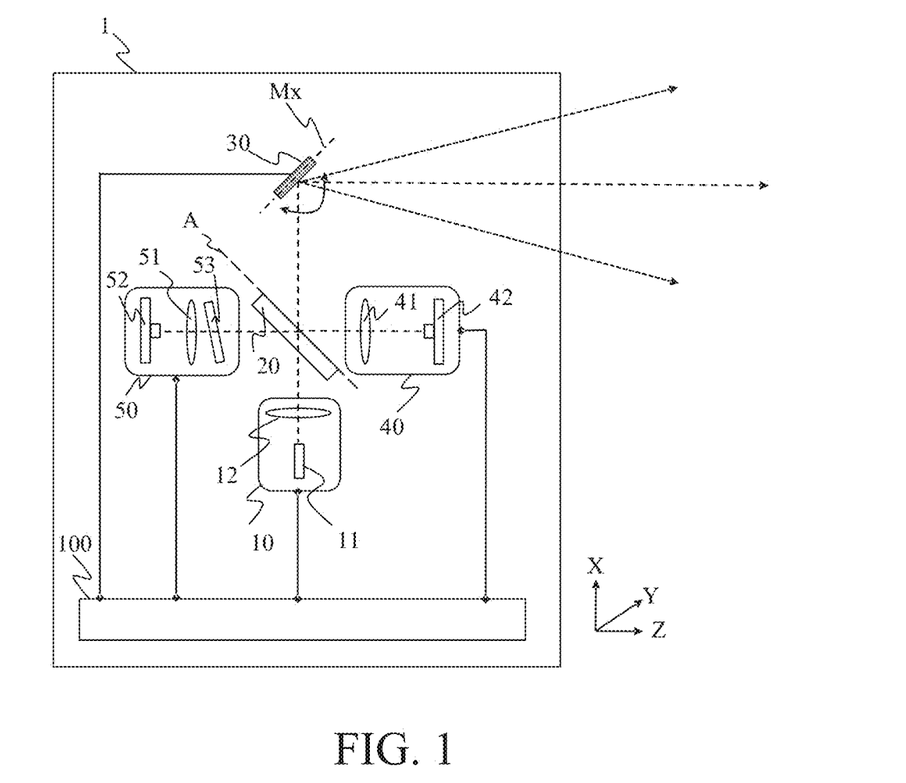
FIG. 1 is a schematic view of a distance measuring apparatus according to a first embodiment.

FIG. 1 is a schematic view of a distance measuring apparatus (optical apparatus) 1 according to this embodiment. The distance measuring apparatus 1 includes a light source unit 10, a splitter (light guide) 20, a drive mirror (deflector) 30, a first detector 40, a second detector 50, and a controller 100.

The light source unit 10 includes a light source 11, and a collimator 12 that makes divergent light from the light source 11 substantially parallel light.

The drive mirror 30 is a two-dimensional scanning drive mirror that is rotationally driven around an axis parallel to a Y axis that passes the center of the mirror and an Mx axis indicated by an alternate long and short dash line and orthogonal the Y axis. The drive mirror 30 deflects the illumination light from the light source unit 10 so as to scan the object (object), and deflects the reflected light from the object so as to guide the light to the splitter 20.

The splitter 20 guides part of the illumination light from the light source unit 10 to the drive mirror 30, and guides another part of the illumination light to the second detector 50. The splitter 20 guides the reflected light from the drive mirror 30 to the first detector 40.

Figure 2:
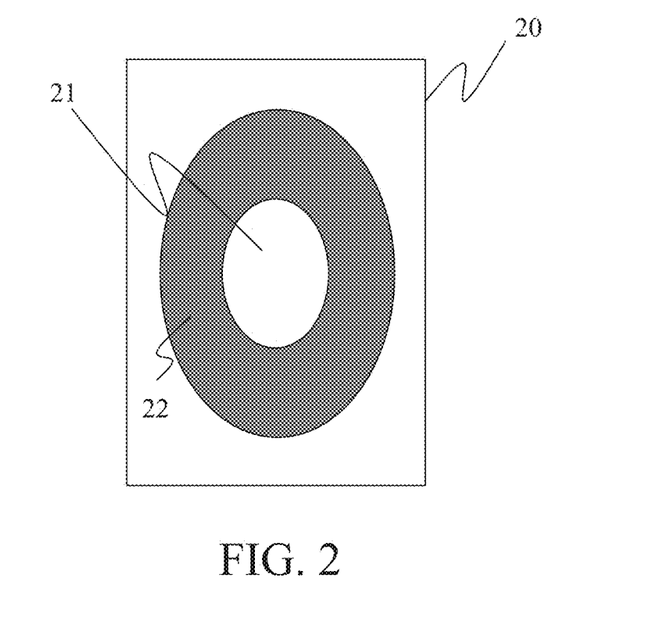
FIG. 2 illustrates an area provided at a splitter.

The splitter 20 includes an optical element having a flat plate shape. As illustrated in FIG. 2, a surface A on the side of the drive mirror 30 of the splitter 20 has an area 21 that transmits part (most) of the illumination light from the light source unit 10 and reflects another part, and an area 22 that reflects the reflected light from the drive mirror 30. When viewed from the light source unit 10 side, the area 21 is smaller than the effective diameter of the drive mirror 30, and the illumination light passing through the area 21 falls within the effective diameter of the drive mirror 30. The area 22 has an effective diameter configured to sufficiently reflect the reflected or scattered light from the object reflected by the drive mirror 30.

In this embodiment, the splitter 20 includes an optical element having a flat plate shape, but the present invention is not limited to this example. The splitter 20 may include an optical element (prism) having a polyhedral shape with a plurality of optical surfaces that are unparallel to each other, or may include an optical element having a flat plate shape and an optical element having a polyhedral shape.

The first detector 40 includes an imaging lens 41, a light receiving element (second light receiving element) 42, and an unillustrated bandpass filter. The light receiving element 42 receives the light reflected or scattered from the object through the drive mirror 30 and the splitter 20.

The second detector 50 includes an imaging lens 51, a light receiving element (first light receiving element) 52, and a neutral density ("ND") filter (dimming element) 53. The illumination light reflected by the splitter 20 is dimmed by the ND filter 53, passes through the imaging lens 51, and is received by the light receiving element 52. The second detector 50 has a role different from the detection of the reflected light from the object, and is used, for example, to detect the illumination timing and measure an illumination light amount. The light receiving element 52 is different in type from the light receiving element 42 in this embodiment. For example, one may be set to a sensor using an avalanche photodiode (APD), and the other may be set to a sensor using another general photodiode. One may be set to a CMOS sensor and the other may be set to a CCD sensor. The ND filter 53 has a flat plate shape, is provided between the splitter 20 and the light receiving element 52, and tilts (is non-vertical) to the principal light ray of the illumination light from the light source portion 10 reflected by the splitter 20 represented by a dotted line. Here, tilting to the principal ray of the illumination light means including an optical surface that tilts to the principal ray of the illumination light. In other words, a normal at an incident point of the principal ray of the illumination light on the optical surface is unparallel to the principal ray.

The controller 100 controls a light emitting parameter of the light source unit 10, driving of the drive mirror 30, and light receiving parameters of the first and second detectors 40 and 50.

Figure 3A:
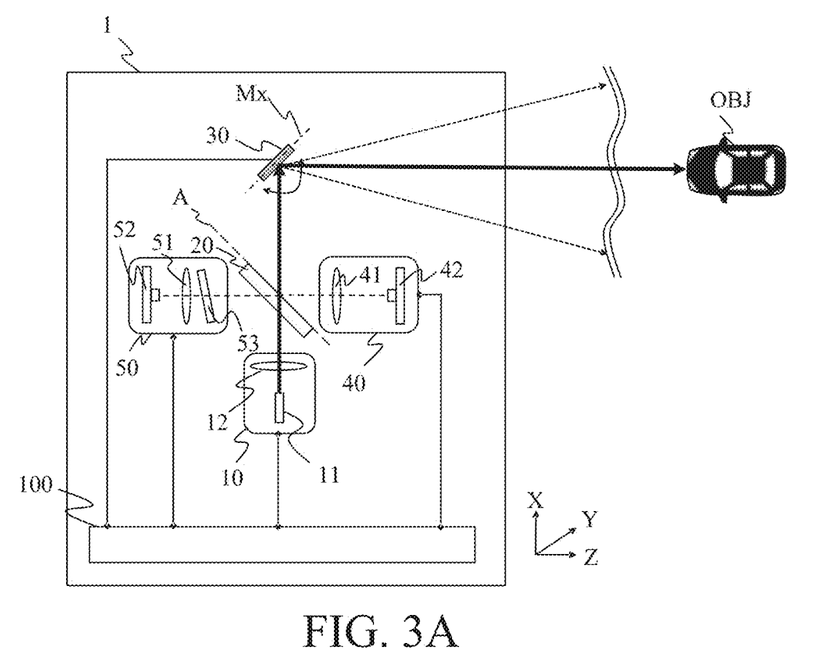
FIGS. 3A to 3C illustrate optical paths in the first embodiment.
Figure 3B:
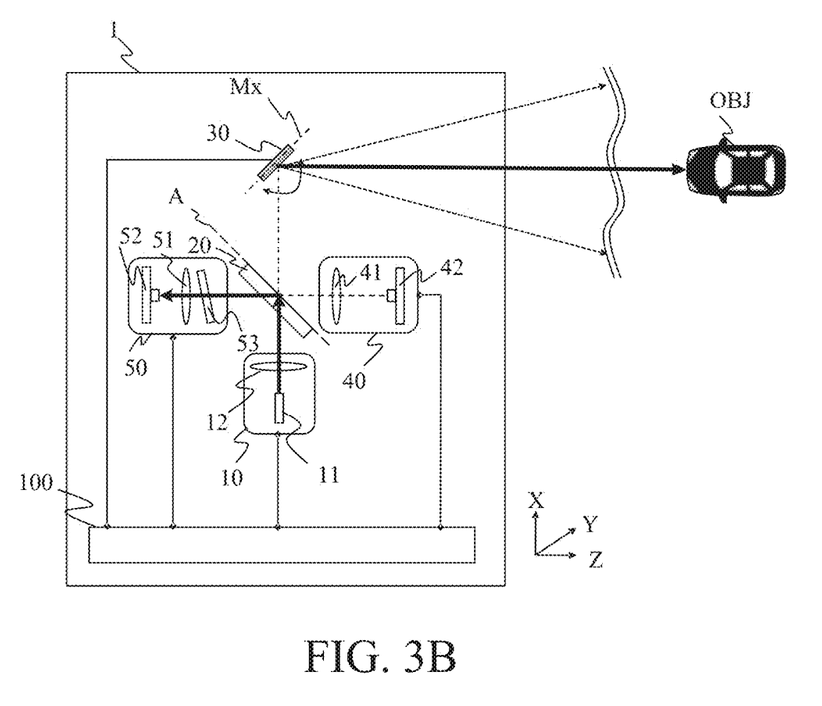
Figure 3C:
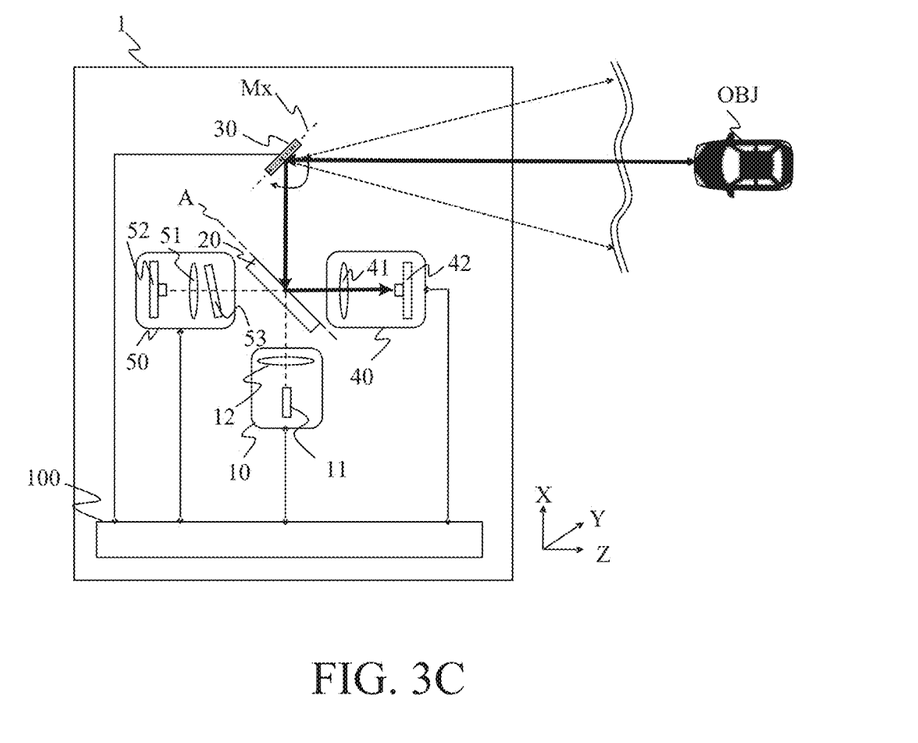

FIGS. 3A to 3C illustrate optical paths in this embodiment. FIG. 3A illustrates that part of the illumination light from the light source unit 10 passes through the area 21 of the splitter 20, is reflected while being scanned by the drive mirror 30, and illuminates an object OBJ. FIG. 3B illustrates that another part of the illumination light from the light source unit 10 is reflected by the area 21 of the splitter 20 and condensed by the second detector 50. FIG. 3C illustrates that the reflected or scattered light from the object OBJ is reflected by the drive mirror 30, reflected in the area 22 of the splitter 20, and condensed by the first detector 40. Due to this configuration, an optical system used for a purpose different from the distance measurement can be made smaller without adding any optical elements.

Figure 4A:
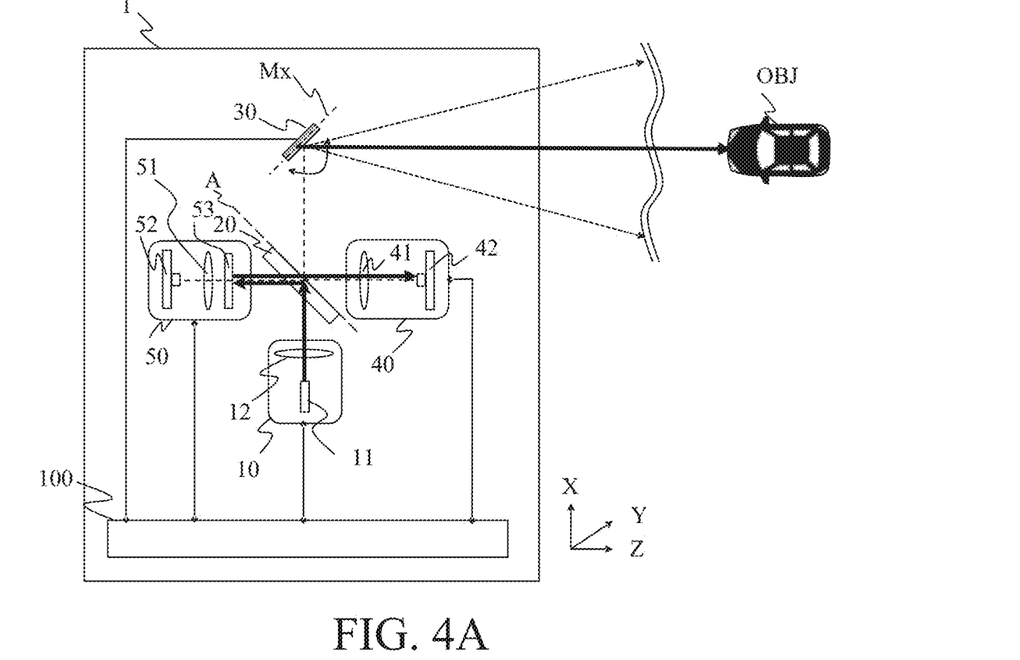
FIGS. 4A and 4B illustrate an optical path in which unnecessary light from a second detector in the first embodiment goes to a first detector and an optical path in which the unnecessary light from the second detector separates from the first detector.

Here, in the optical path in FIG. 3B, the reflected or scattered light from the ND filter 53 (unnecessary light hereinafter) is likely to be received by the light receiving element 42. If the ND filter 53 is substantially perpendicular to the principal ray of the illumination light reflected by the splitter 20 as illustrated in FIG. 4A, the unnecessary light passes through the area 21 of the splitter 20 and is easily received by the light receiving element 42. The unnecessary light may be restrained down to $10^{-8}$ or less where an output of the light source unit is set to 1. Where the area 21 of the splitter 20 has a reflectance of 5% and the ND filter 53 has a reflectance of 5%, the unnecessary light is about $2.5 \times 10^{-3}$, which is much higher than a permissible value of $10^{-8}$ of the unnecessary light.

Figure 4B:
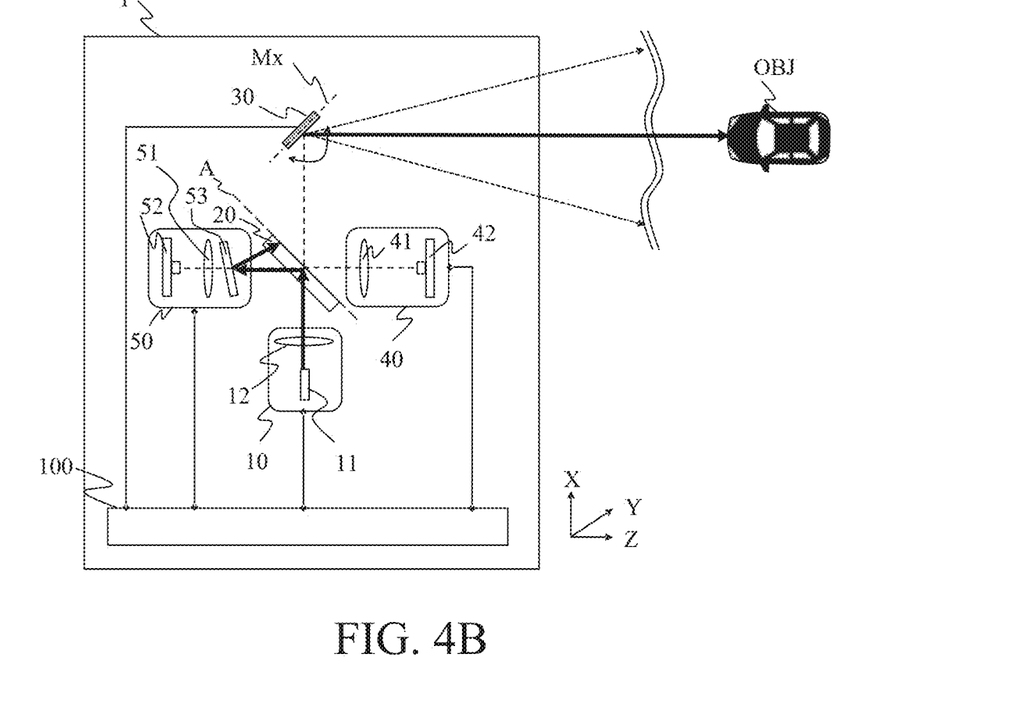

In this embodiment, the ND filter 53 tilts to the principal ray of the illumination light reflected by the splitter 20 as illustrated in FIG. 4B, and thus most of the unnecessary light do not pass the area 21 of the splitter 20 and go to other places. Therefore, most of the unnecessary light can be separated from the first detector 40. For example, $\theta > \tan(d/2f)$ may be satisfied where f(mm) is a focal length of the imaging lens 41, $\varphi$d(mm) is a size of the light receiving element 42, and $\theta$(degree) is a tilt angle of the unnecessary light to the principal ray of the illumination light reflected by the splitter 20. In this case, the unnecessary light separates from the light receiving element 42 (or is not received by the light receiving element 42). More specifically, where the focal length of the imaging lens 41 is 20 mm and the size of the light receiving element 42 is 500 μm, the tilt angle $\theta$) may be larger than 0.72 degrees.

In order to restrain the unnecessary light generated by the ND filter 53 from hitting the barrel or the like and from causing intensified return light from the barrel or the like from occurring, there may be provided a diffuser that diffuses the unnecessary light and an absorber that absorbs the unnecessary light on a reflection optical path of the unnecessary light reflected by the ND filter 53.

As described above, the configuration in this embodiment can accurately measure a distance with an optical system used for a purpose different from the distance measurement.

This embodiment tilts the ND filter 53 and restrains the unnecessary light generated by the ND filter 53 from being received by the light receiving element 42, the present invention is not limited to this example. For example, when another optical element such as a diffusion element or a bandpass filter is provided between the splitter 20 and the light receiving element 52, the provided optical element may be tilted. The imaging lens 51 may be tilted.

In order to restrain the unnecessary light generated by the optical element provided between the splitter 20 and the light receiving element 52 from being received by the light receiving element 42, this embodiment tilts the optical element, the present invention is not limited to this example. The optical element may be eccentric to the principal ray of the illumination light reflected by the splitter 20. In other words, a surface apex on the optical surface included in the optical element and an incident point of the principal ray of the illumination light may be spaced from each other. Thereby, the same effect as that of the present invention can be obtained. For example, the imaging lens 51 may be eccentric (or decentered).

The light receiving element 52 may be tilted to the principal ray of the illumination light, in other words, the normal at the incident point of the principal ray of the illumination light on the light receiving surface of the light receiving element 52 may be unparallel to the principal ray. Thereby, the unnecessary light that is regularly reflected on the light receiving surface of the light receiving element 52 can be restrained from being received by the light receiving element 42. Two or more of the three means, i.e., tilting the optical element, decentering the optical element, and tilting the light receiving element 52, may be combined.

Second Embodiment

Figure 5:
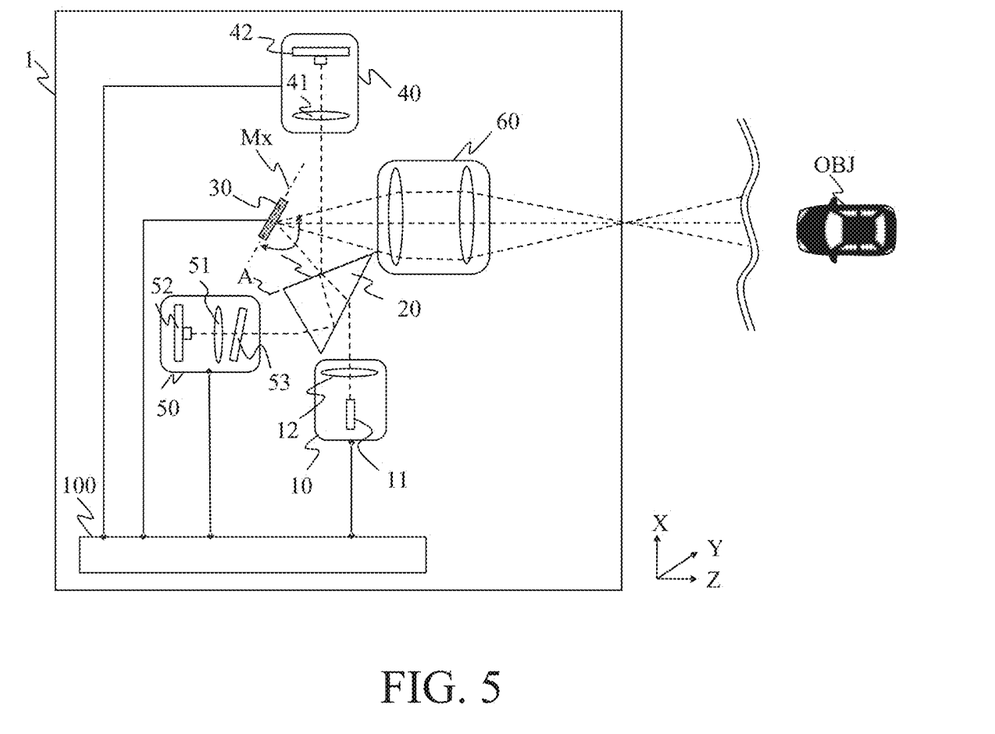
FIG. 5 is a schematic view of a distance measuring apparatus according to a second embodiment.

FIG. 5 is a schematic view of a distance measuring apparatus 1 according to this embodiment. The distance measuring apparatus 1 according to this embodiment is different from the distance measuring apparatus 1 in the first embodiment in that the splitter 20 is not a flat plate shape but is a polyhedral prism having a plurality of surfaces, and in having a magnification varying optical system 60 disposed on the light emitting side of the drive mirror 30. The magnification varying optical system 60 has no refractive power in the overall system, and guides the illumination light from the drive mirror 30 to the object OBJ and guides the reflected light from the object OBJ to the drive mirror 30. Since other configurations are the same as those of the first embodiment, a detailed description thereof will be omitted.

Figure 6:
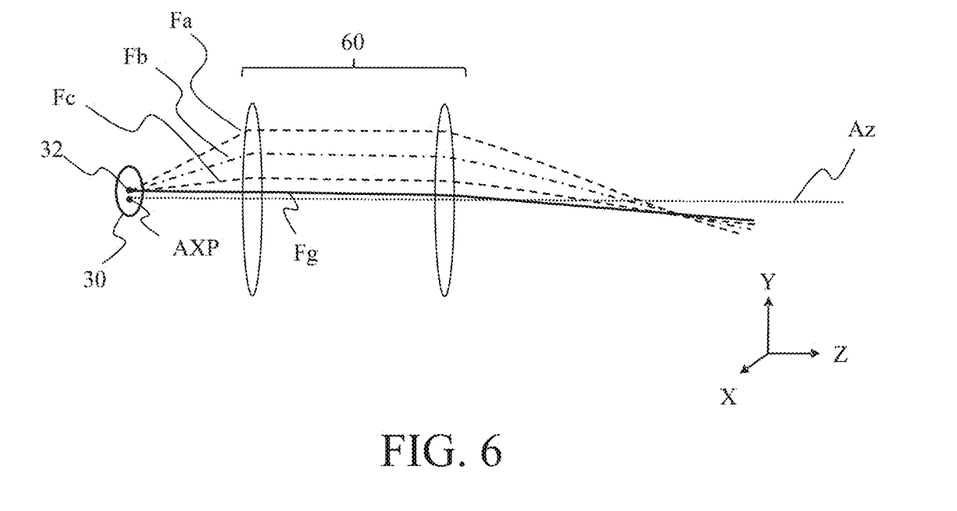
FIG. 6 illustrates a relationship between a magnification varying optical system and a drive mirror.

FIG. 6 illustrates a relationship between the magnification varying optical system 60 and the drive mirror 30 and, in the configurations of FIG. 5, the configuration on the light emitting side of the drive mirror 30 is illustrated in the YZ plane. Fa, Fb, and Fc are an illumination optical path having the outermost angle of view when the drive mirror 30 swings relative to the Mx axis, an illumination optical path when the swing angle of the drive mirror 30 is 0, and an illumination optical path having the outermost angle of view on the opposite side the illumination optical path Fa, respectively. The illumination optical path Fc is an illumination optical path having the outermost axis angle of view used for measuring the distance to the object OBJ, and is not an illumination optical path when the drive mirror 30 swings to the maximum. In a tilting and reflecting range of the drive mirror 30, the illumination optical paths Fa, Fb, and Fc use only one side with respect to the optical axis of the magnification varying optical system 60 so as to prevent the illumination light from vertically entering the optical element of the magnification varying optical system 60. Thereby, a slight amount of reflected light generated on the optical element surface does not reach the light receiving surface of the light receiving element 42, and no stray light occurs.

Fg represents an illumination optical path when the drive mirror 30 has the largest swing angle relative to the Mx axis. When the illumination optical path Fg is vertically incident on the optical element of the magnification varying optical system 60, a small amount of the reflected light from the optical element is reflected by the splitter 20 through the same optical path as the illumination optical path Fg. and is detected as stray light by the first detector 40. The angle of view between the illumination optical path Fc and the illumination optical path Fg is a margin for the angle of view at which no stray light occurs. For example, an amount deviated by the manufacturing error may be provided as the margin.

FIG. 6 illustrates that the optical axis of the magnification varying optical system 60 and an intersection AXP of the drive mirror 30 shift from a center 32 of the drive mirror 30. That is, the optical axis of the magnification varying optical system 60 is eccentric to the center position of the drive mirror 30 (the drive mirror 30 is placed on the deflection surface of the drive mirror 30 so that the incident point of the principal ray of the illumination light and the optical axis of the variable magnification optical system 60 are spaced from each other). Thereby, the stray light from the illumination optical path Fg can be decentered. Since the area where no stray light occurs can be extended up to the angle of view outside the illumination optical path Fg, an area from the illumination optical path Fc to the direction toward the illumination optical path Fg can be used to measure the distance to the object OBJ. When the illumination optical path Fb is distributed to the illumination optical path Fg side, the illumination optical path Fa can be allocated to the optical axis center side of the magnification varying optical system 60, so that the effective diameter of the magnification varying optical system 60 can be reduced and the distance measuring apparatus 1 can be entirely made smaller. Therefore, it is desirable that the center 32 of the drive mirror 30 and the optical axis of the magnification varying optical system 60 may not coincide with each other on the drive mirror 30.

As illustrated in FIG. 5, the splitter 20 is a polygonal optical element in this embodiment. Similar to the splitter 20 in the first embodiment, the surface A of the splitter 20 on the drive mirror 30 side has the area 21 that transmits part (most) of the illumination light from the light source unit 10 and reflects another part, and the area 22 that reflects the reflected light from the drive mirror 30.

Figure 7A:
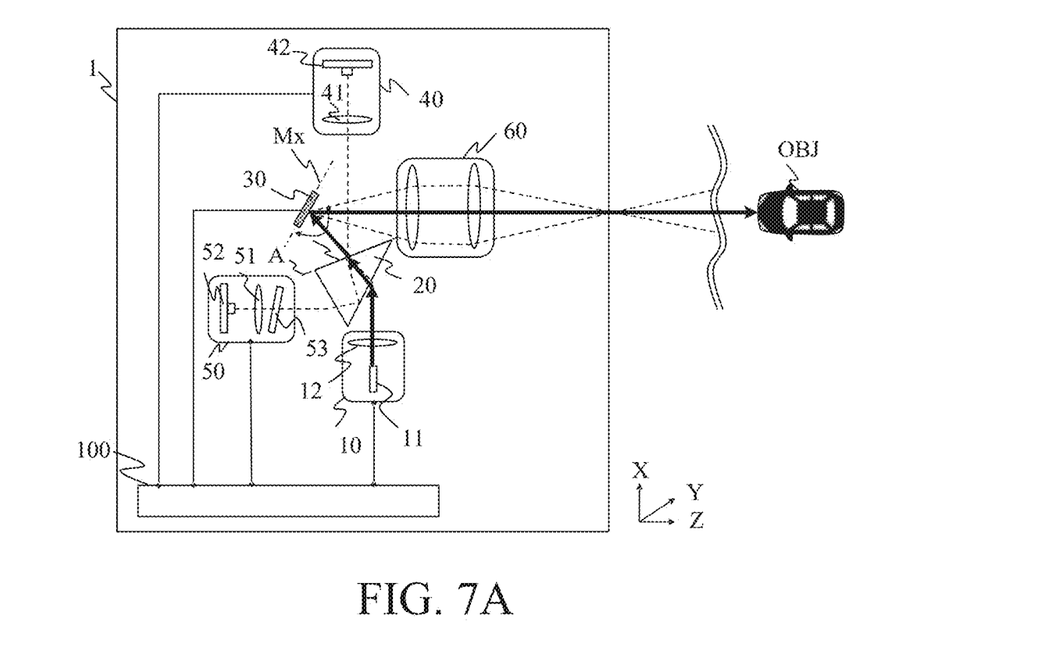
FIGS. 7A to 7C illustrate optical paths in the second embodiment.
Figure 7B:
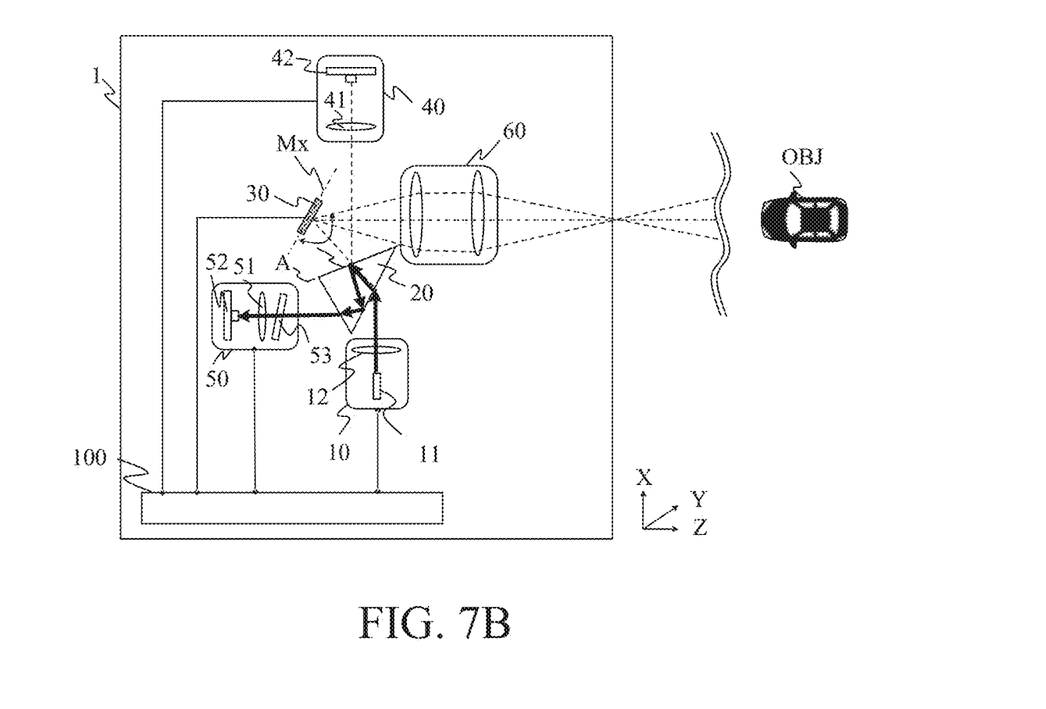
Figure 7C:
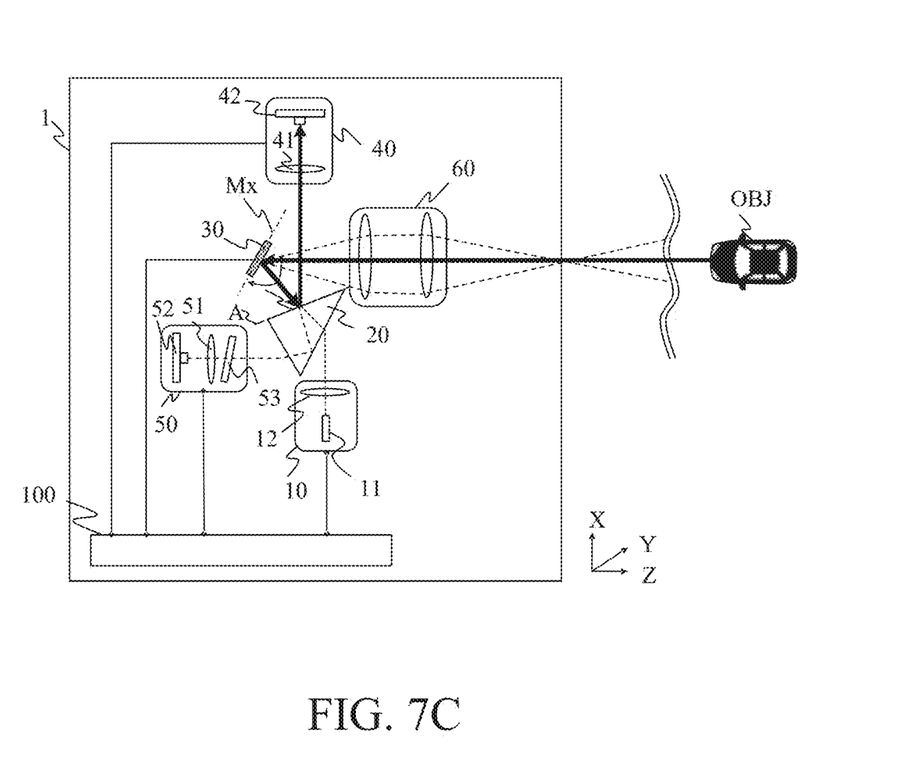

FIGS. 7A to 7C illustrate optical paths in this embodiment. FIG. 7A illustrates that part of the illumination light from the light source unit 10 enters the splitter 20 and is refracted, passes through the area 21 of the splitter 20, is reflected while being scanned by the drive mirror 30, and illuminates the object OBJ. FIG. 7B illustrates that another part of the illumination light from the light source unit 10 enters the splitter 20 and is refracted, is reflected in the area 21 of the splitter 20, and is condensed on the second detector 50 while being turned in the splitter 20 by the reflection and refraction. FIG. 7C illustrates that the reflected or scattered light from the object OBJ is reflected by the drive mirror 30, reflected in the area 22 of the splitter 20, and condensed on the first detector 40. Due to this configuration, the luminous flux that has passed through the splitter 20 of this embodiment has a luminous flux diameter reduced or enlarged on the XZ plane, while the divergence angle is enlarged or reduced.

Figure 8A:
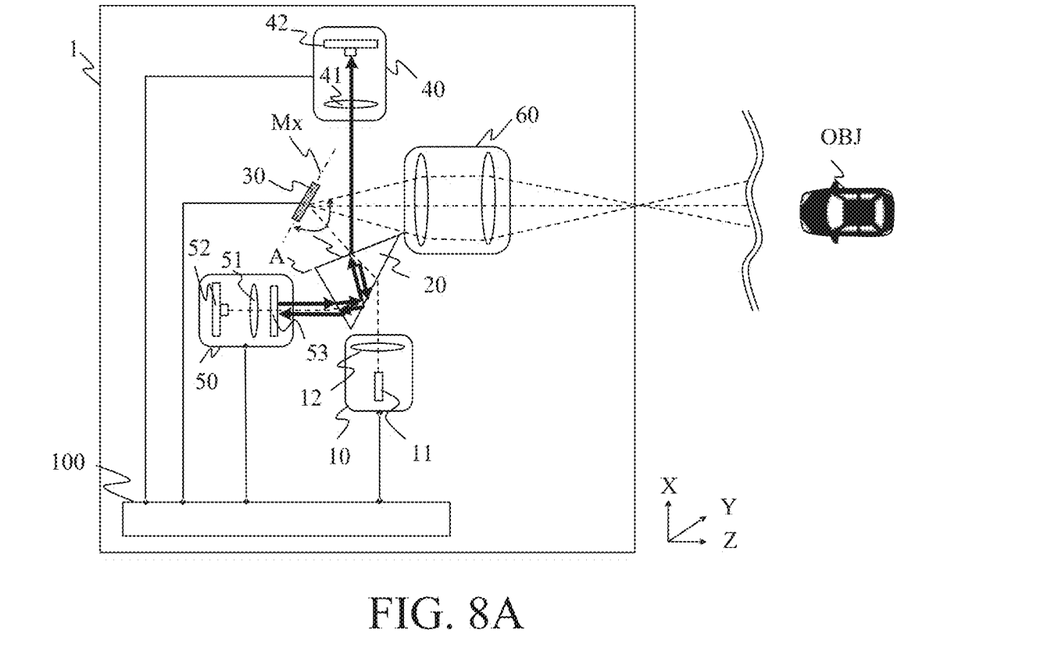
FIGS. 8A and 8B illustrate an optical path in which unnecessary light from a second detector in the second embodiment goes to a first detector and an optical path in which the unnecessary light from the second detector separates from the first detector.

Here, in the optical path in FIG. 7B, the reflected or scattered light from the ND filter 53 (unnecessary light hereinafter) is likely to be received by the light receiving element 42. If the ND filter 53 is substantially vertical to the principal ray of the illumination light reflected by the splitter 20 as illustrated in FIG. 8A, the unnecessary light passes through the area 21 of the splitter 20 and is received by the light receiving element 42.

Figure 8B:
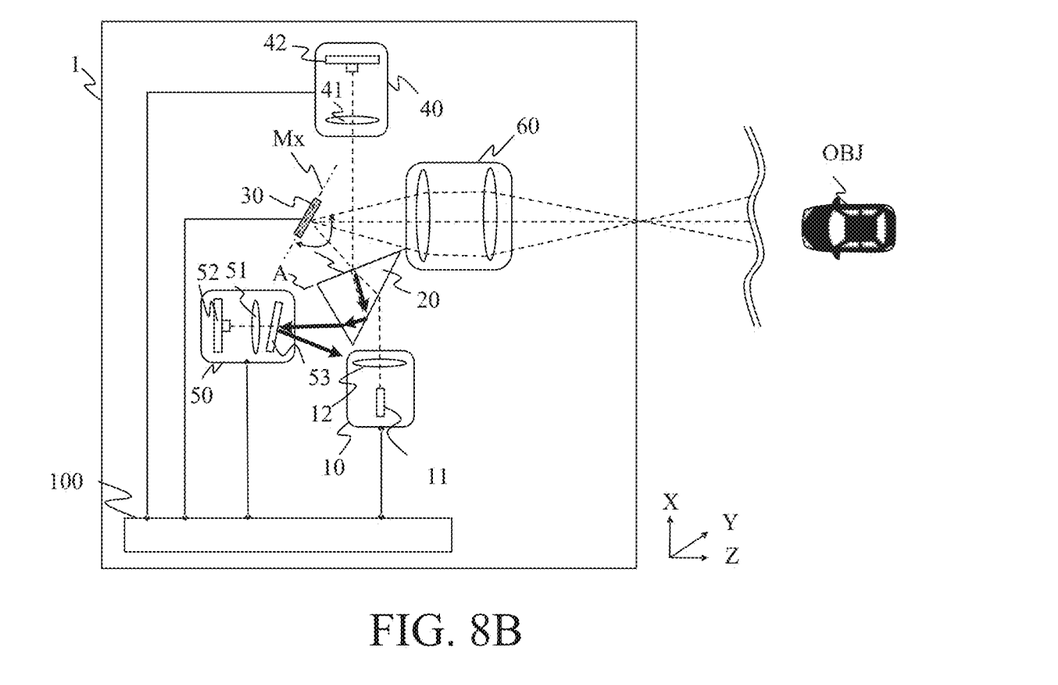

In this embodiment, the ND filter 53 tilts to the principal ray of the illumination light reflected by the splitter 20 as illustrated in FIG. 8B, and thus most of the unnecessary light does not pass through the area 21 and moves to other places. Thus, most of the unnecessary light can be kept away from the first detector 40.

As described above, the configuration according to this embodiment can accurately measure a distance with an optical system used for a purpose different from the distance measurement.

In-Vehicle System

Figure 9:
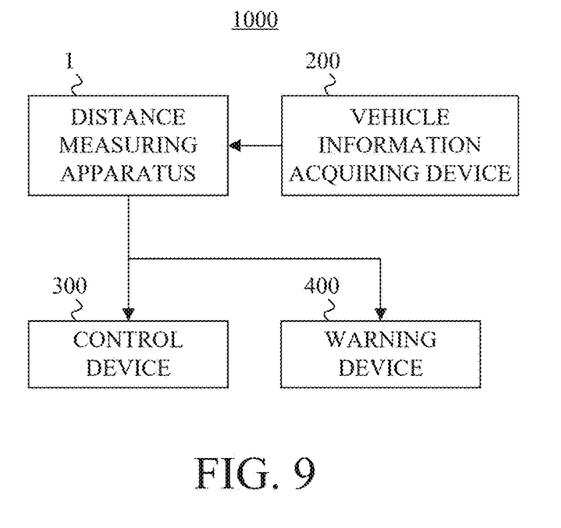
FIG. 9 is a configuration diagram of an in-vehicle system according to this embodiment.
Figure 10:
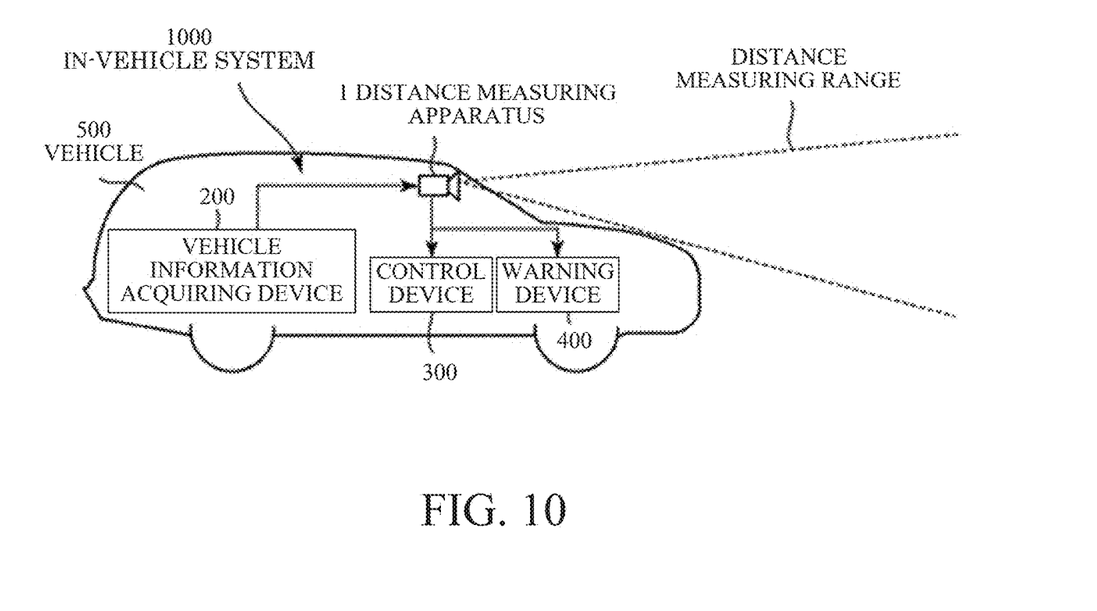
FIG. 10 is a schematic view of a vehicle (mobile apparatus) according to this embodiment.

FIG. 9 is a configuration diagram of the distance measuring apparatus 1 according to this embodiment and an in-vehicle system (driving support device) 1000 including the distance measuring apparatus 1. The in-vehicle system 1000 is an apparatus held by a movable body (mobile apparatus) such as an automobile (vehicle), and configured to support driving (maneuvering) of the vehicle based on distance information of an object such as an obstacle or a pedestrian around the vehicle acquired by the distance measuring apparatus 1. FIG. 10 is a schematic view of a vehicle 500 including the in-vehicle system 1000. FIG. 10 illustrates that the distance measuring range (detection range) of the distance measuring apparatus 1 is set to the front of the vehicle 500, but the distance measuring range may be set to the back or side of the vehicle 500.

As illustrated in FIG. 9, the in-vehicle system 1000 includes the distance measuring apparatus 1, a vehicle information acquiring device 200, a control device (ECU: electronic control unit) 300, and a warning device (warning unit) 400. In the in-vehicle system 1000, the controller 100 included in the distance measuring apparatus 1 serves as a distance acquirer (acquirer) and a collision determiner (determiner). However, if necessary, the in-vehicle system 1000 may be provided with a distance acquirer and a collision determiner that are separate from the controller 100, and each may be provided outside the distance measuring apparatus 1 (for example, inside the vehicle 500). Alternatively, the control device 300 may be used as the controller 100.

Figure 11:
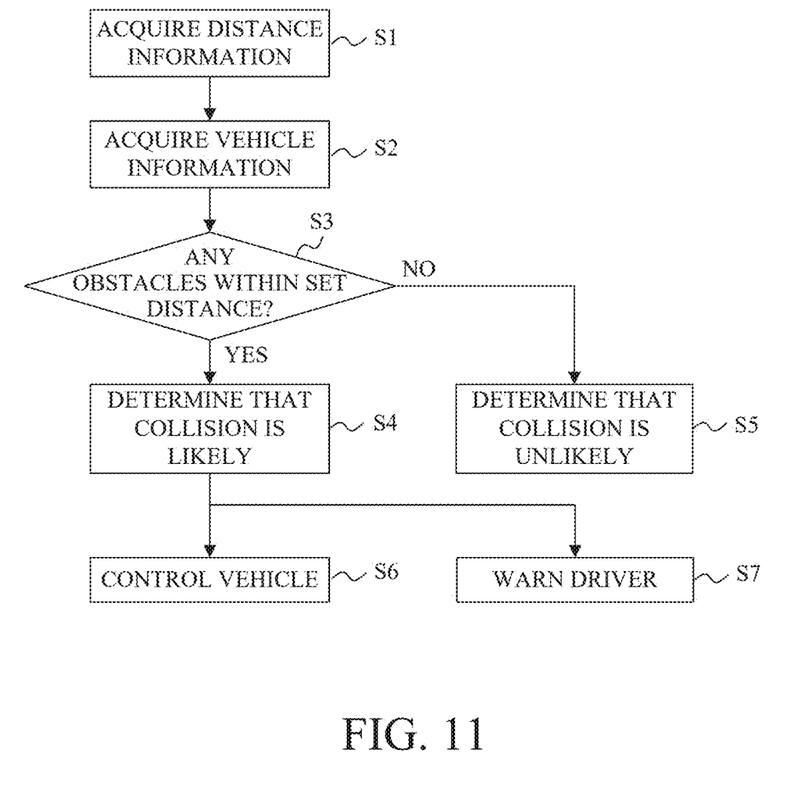
FIG. 11 is a flowchart showing an operation example of an in-vehicle system according to this embodiment.

FIG. 11 is a flowchart showing an operation example of the in-vehicle system 1000 according to this embodiment. A description will now be given of an operation of the in-vehicle system 1000 along this flowchart.

First, in the step S1, the light source unit 10 in the distance measuring apparatus 1 illuminates the object around the vehicle, and the controller 100 acquires distance information of the object OBJ based on the signal output by the light receiving element 42 by receiving the reflected light from the object. In the step S2, the vehicle information acquiring device 200 acquires vehicle information including a vehicle speed, a yaw rate, a steering angle, and the like. Then, in the step S3, the controller 100 determines whether the distance to the object OBJ is included in a preset distance range, using the distance information acquired in the step S1 and the vehicle information acquired in the step S2.

This configuration can determine whether or not the object exists within the set distance around the vehicle, and determine the likelihood of the collision between the vehicle and the object. The steps S1 and S2 may be performed in the reverse order of the above order, or may be processed in parallel with each other. The controller 100 determines that the collision is likely when the object exists within the set distance (step S4), and determines that the collision is unlikely when the object does not exist within the set distance (step S5).

Next, when the controller 100 determines that the collision is likely, the controller 100 informs (transmits) the control device 300 and the warning device 400 of the determination result. At this time, the control device 300 controls the vehicle based on the determination result of the controller 100 (step S6), and the warning device 400 warns the user (driver) of the vehicle based on the determination result of the controller 100 (step S7). The determination result may be notified to at least one of the control device 300 and the warning device 400.

The control device 300 can control moving the vehicle by outputting a control signal to a driver, such as an engine and a motor, of the vehicle. For example, the vehicle makes a control and generates control signals for applying the brakes, returning the accelerator, turning the steering wheel, and applying a braking force to each wheel to suppress the outputs of the engine or the motor. The warning device 400 warns the driver, for example, by emitting a warning sound, by displaying warning information on a screen of a car navigation system, or by vibrating the seat belt or steering wheel.

Thus, the in-vehicle system 1000 according to this embodiment can detect the object and measure the distance using the above processing, and can avoid the collision between the vehicle and the object. In particular, by applying the distance measuring apparatus 1 according to each of the above embodiments to the in-vehicle system 1000, the distance can be accurately measured, the object can be accurately detected, and the collision can be accurately determined.

This embodiment applies the in-vehicle system 1000 to the driving support (to mitigate the collision damage), but the present invention is not limited to this example. The in-vehicle system 1000 may be applicable to cruise control (including all vehicle speed tracking function) and automatic driving. The in-vehicle system 1000 is applicable not only to a vehicle such as an automobile but also to a moving body such as a ship, an aircraft, or an industrial robot. The in-vehicle system 1000 is also applicable only to a moving body but also to various devices using object recognition such as Intelligent Transport System (ITS) and a surveillance system.

The in-vehicle system 1000 and the mobile apparatus may include an informing apparatus (informer) for informing the manufacturer of the in-vehicle system and the seller (dealer) of the mobile apparatus of the fact that the mobile apparatus collides with an obstacle. For example, the informing apparatus may transmit information (collision information) on a collision between the mobile apparatus and the obstacle to a preset external destination by e-mail or the like.

Thus, the configuration that automatically informs the collision information using an informing device can promptly provide measures such as an inspection and a repair after the collision occurs. The destination of the collision information may be set to an insurance company, a medical institution, the police, or an arbitrary place which a user can set. The informing device may be configured to inform the destination of failure information of each part and consumption information of consumables in addition to the collision information. The presence or absence of the collision may be detected based on the distance information acquired based on the output from the light receiver described above, or based on another detector (sensor).

Each of the above embodiments can provide an optical apparatus, an in-vehicle system, and a mobile apparatus, each of which can restrain unnecessary light from being received by the light receiving element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-052028, filed on Mar. 24, 2020, which is hereby incorporated by reference herein in its entirety.

What is claimed is:

1. An optical apparatus comprising:
   a deflector configured to deflect illumination light from a light source unit so as to scan an object by being driven, and configured to deflect reflected light from the object, the illumination light being light before it is incident on the object;
   a light guide configured to guide part of the illumination light from the light source unit to the deflector, another part to a first light receiving element, and the reflected light from the object via the deflector to a second light receiving element; and
   an optical element having an optical surface provided between the light guide and the first light receiving element,
   wherein the optical surface tilts or is eccentric to a principal ray of the illumination light, and
   wherein an optical path of the illumination light from the light guide to the deflector is fixed.

2. The optical apparatus according to claim 1, wherein the optical element has a flat plate shape, and the optical surface tilts to the principal ray.

3. The optical apparatus according to claim 1, wherein the optical element includes a lens, and the optical surface is eccentric to the principal ray.

4. The optical apparatus according to claim 1, wherein the light guide transmits the part of the illumination light, reflects the other part of the illumination light, and reflects the reflected light from the deflector.

5. The optical apparatus according to claim 1, wherein the light guide includes an optical element having a flat plate shape.

6. The optical apparatus according to claim 1, wherein the light guide includes an optical element having a flat plate shape, and an optical element having a plurality of optical surfaces that are unparallel to each other.

7. The optical apparatus according to claim 1, further comprising a diffuser configured to diffuse the illumination light reflected by the optical element.

8. The optical apparatus according to claim 1, further comprising an absorber configured to absorb the illumination light reflected by the optical element.

9. The optical apparatus according to claim 1, wherein the first and second light receiving elements are different types of light receiving elements.

10. The optical apparatus according to claim 1, further comprising an optical system configured to guide the illumination light from the deflector to the object and to guide the reflected light from the object to the deflector.

11. The optical apparatus according to claim 10, wherein an optical axis of the optical system intersects with a deflection surface of the deflector, and wherein an incident point of the principal ray of the illumination light on the deflection surface and an intersection of the optical axis and the deflection surface are spaced from each other.

12. The optical apparatus according to claim 1, wherein a light receiving surface of the first light receiving element tilts to the principal ray of the illumination light.

13. An in-vehicle system comprising an optical apparatus according to claim 1, and configured to determine a likelihood of a collision between a vehicle and an object based on distance information of the object obtained by the optical apparatus.

14. The in-vehicle system according to claim 13, further comprising a control device configured to output a control signal that generates a braking force in the vehicle when determining that the collision is likely.

15. The in-vehicle system according to claim 13, further comprising a warning device configured to warn a driver of the vehicle when determining that the collision is likely.

16. The in-vehicle system according to claim 13, further comprising an informing device configured to inform information on the collision between the vehicle and the object.

17. A mobile apparatus comprising an optical apparatus according to claim 1, and configured to hold and move the optical apparatus.

18. The optical apparatus according to claim 1,
    wherein the optical element is a dimming element,
    wherein the light guide includes a plurality of optical surfaces, which respectively guide at least one of the illumination light and the reflected light, and
    wherein the plurality of optical surfaces are unparallel to each other and respectively tilt to the principal ray of the illumination light and the reflected light.

19. The optical apparatus according to claim 18, wherein the plurality of the optical surfaces include a first surface, where the illumination light enters, a second surface, which passes part of the illumination light, reflects another part of the illumination light, and reflects the reflected light from the deflector, and a third surface, which guides the another part of the illumination light to the first light receiving element.

20. An optical apparatus comprising:
    a deflector configured to deflect illumination light from a light source unit so as to scan an object by being driven, and configured to deflect reflected light from the object, the illumination light being light before it is incident on the object; and
    a light guide configured to guide part of the illumination light from the light source unit to the deflector, another part to a first light receiving element, and the reflected light from the object via the deflector to a second light receiving element,
    wherein a light receiving surface of the first light receiving element tilts to a principal ray of the illumination light, and
    wherein an optical path of the illumination light from the light guide to the deflector is fixed.

* * * * *